Figure 1:
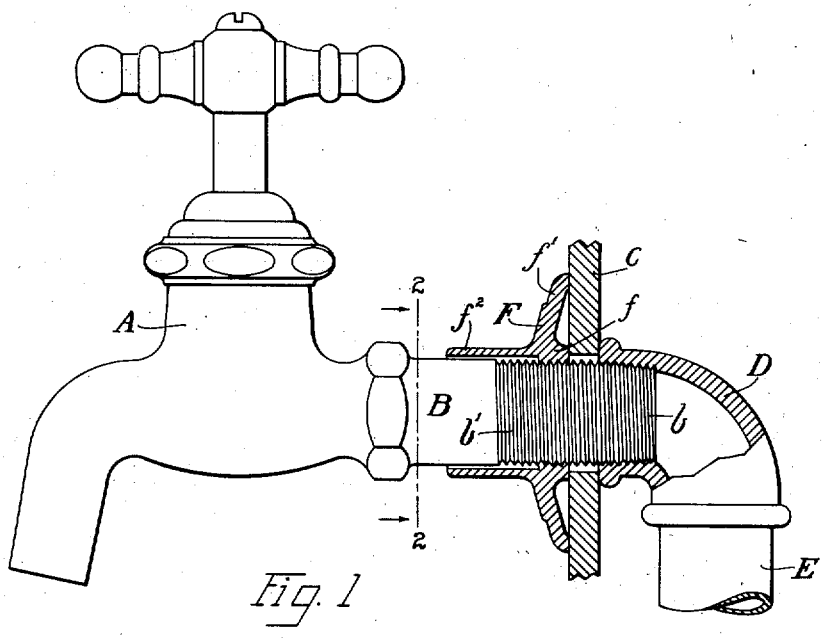

J. REGAR.

FAUCET ATTACHMENT.

APPLICATION FILED MAY 28, 1914.

Reissued Aug. 4, 1914. 13,786.

Witnesses
J. Frederic Chung
Justin W. Macklin

Inventor
Joseph Regar,
By Albert H. Baker,
Atty

UNITED STATES PATENT OFFICE.

JOSEPH REGAR, OF CLEVELAND, OHIO, ASSIGNOR TO THE REGAR BRASS MANUFACTURING COMPANY, OF CLEVELAND, OHIO, A CORPORATION OF OHIO.

FAUCET ATTACHMENT.

13,786. Specification of Reissued Letters Patent. Reissued Aug. 4, 1914.

Original No. 1,078,379, dated November 11, 1913, Serial No. 568,647. Application for reissue filed May 28, 1914. Serial No. 841,666.

*To all whom it may concern:*

Be it known that I, JOSEPH REGAR, a citizen of the United States, residing at Cleveland, in the county of Cuyahoga and State of Ohio, have invented a certain new and useful Improvement in Faucet Attachments, of which the following is a full, clear, and exact description, reference being had to the accompanying drawings.

This invention relates to water-cocks or faucets of the type generally used with sinks or wherever such a device is needed, and it has for its object the production of a device of that type that will present a neat appearance, that will have all the threads thereon concealed and protected, that will be capable of ready application and that will be securely held in position when once applied. These objects are attained in the construction shown in the drawings, in which,—

Figure 3:
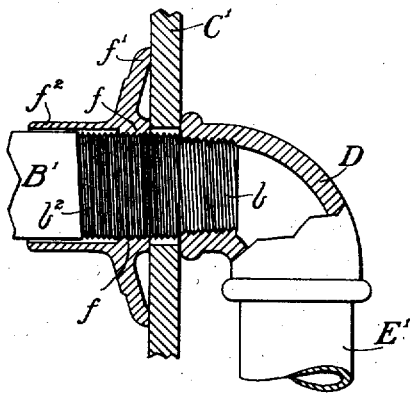
Figure 2:
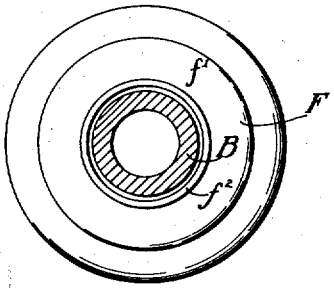

Figure 1 is a side view, partly in section and partly in elevation, of my invention, showing the same applied to a back or dash-board, the latter also being shown in section; Fig. 2 is a section taken on the line 2—2 of Fig. 1, looking in the direction of the arrows thereon; and Fig. 3 is a view showing in section parts of a cock of modified construction.

First taking up the description, by the use of reference characters, of the form shown in Figs. 1 and 2, A represents a water-cock having a shank B, the same being adapted to project through the back or dash-board C which is customarily used on sinks and like places, or through the wall of a bath-tub or similar device, and D is the elbow or other pipe connection joining the shank of the cock with the pipe E. The rear end of the shank B is preferably tapered and provided with male threads so as to fit the elbow D, it being customary to taper the threaded interior of such connections. The threads $b$ on said tapered portion are, however, continued at the same pitch forwardly by untapered male threads $b^1$ over part of the shank for some distance, said threads extending inside of the back or dash-board C when the parts are assembled.

Surrounding the shank B and threaded thereon is a collar F comprising an internally threaded ring $f$, a disk-like flange $f^1$, and a forwardly extending thin cylindrical sleeve $f^2$. These three members are shown as one single integral piece. The sleeve $f^2$ is internally unthreaded and has a larger internal diameter than the ring $f$. This sleeve protects and conceals the threads $b^1$ on the shank. The flange is shown as rearwardly inclined and dished so that its outer edge may effectively contact with the back C. As stated, the threads $b^1$ are continued forwardly from the tapered portion of the shank; and this threaded and untapered portion of the shank is substantially equal in length to the combined length of the ring $f$ and the sleeve $f^2$ attached thereto. That is to say, the distance from the front edge of the sleeve to the rear edge of the flange is substantially equal to the length of the threaded portion of the shank in front of the tapered portion, so that, no matter how thin the back or dash-board C may be made, the sleeve $f^2$ will project over and beyond the threads on the shank.

In applying the cock, the collar F is screwed onto the shank so as to leave the rear end of the latter projecting, which end is then inserted through the back and screwed into the elbow D. The collar F is then screwed rearwardly until it clamps the back between itself and the front edge of the elbow or other connection at the rear, in which position the sleeve $f^2$ projects forwardly beyond the threaded portion of the shank and thus protects the threads and also conceals the same, so that the entire structure presents an attractive appearance. I find it desirable in applying the cock to stop screwing the shank into the elbow when the cock stands at almost ninety (90) degrees from its final position and to then screw the collar against the back. When in this position, a final turn of the cock to its proper angle results in tightly clamping the back between the collar and elbow.

In the form shown in Fig. 3, the same reference characters as heretofore designate the parts already described as before, the rear end of the shank of the cock is tapered and threaded to fit the threaded portion of the elbow. Instead, however, of extending the threads continuously forward over the untapered portion, the shank in front of the taper is somewhat enlarged in diameter which enlarged portion is threaded at $b^2$ to receive the threads of the collar F. The pitch of the threads $b^2$ may or may not be the same as that of the threads on the tapered end of the shank, the drawing showing these threads of shorter or finer pitch. The threads $b^2$ will, of course, correspond in pitch with those in the ring $f$.

It will be seen that in both the forms of threading shown, the flange is passed over the taper thread on to the parallel thread, either rotating in such passage or moving without such rotation. The unthreaded portion B of the shank of the cock extends for a distance at least as great as that of the sleeve $f^2$, so that the sleeve may entirely overlie the unthreaded portion of the shank, or its extreme edge just overlap it, as desired, giving an adjustment substantially equal to the length of the sleeve. This provides for attaching the cock into all sorts of supports—bath tubs, sink backs, wooden boards, etc.

By means of this construction, both a flange and a sleeve of unusual thinness may be employed, since it is not necessary to have it even of sufficient thickness to withstand the application of a wrench to bring it to place. The cock itself carries the collar into firm engagement with the back as the cock is turned to its final position. All close cutting and fitting of the pipe becomes unnecessary by the use of this construction, since the sleeve is of sufficient length to cover all of the threads on the shank in every position of the collar. The collar makes a close and sanitary fit, both with the lavatory back and with the shank of the cock. The thinness allowable for the sleeve and flange enables them to be made, if desired, with a certain amount of flexibility which can be utilized in increasing the tightness of joint between the periphery of the flange and the back. Not only is time and labor saved by avoiding the necessity for accurate cutting of the pipe fixtures, but the initial cost of the collar can be greatly reduced through saving of metal, even when, through a desire to maintain a previous style or type or for the sake of appearance, the form of a nut is simulated on the outside of the collar.

Having thus described my invention, what I claim is:

1. The combination, in a faucet cock or bib, of a shank having a tapered male thread at the end portion of the shank and a straight male thread on an intermediate portion and a collar having a straight threaded opening adapted to coact with the straight threads on the shank, the straight threads on the shank extending for a considerably greater distance than the threads on the collar, whereby the collar may stand on the straight thread of the shank in advance of the rear end of such thread, and a cylindrical sleeve on the forward side of the collar adapted to extend over the threads on the shank in front of the engaging portion of the collar, irrespective of the position of the collar on such threads.

2. The combination, with a faucet, bib or cock having a shank provided near the end with a tapered male thread and on an intermediate portion with a straight male thread of a number of turns, a collar screw threaded on the straight thread and adapted to stand with its rear face in front of the beginning of the straight thread; and having a forwardly projecting cylindrical sleeve adapted to surround and hide the straight threads in front of the threaded engagement of the collar, irrespective of the position of the collar on the straight thread, the tapered thread being adapted to occupy and firmly seat in a standard female fitting at the rear of a lavatory back or wall, the collar being adapted to simultaneously abut the front face of such back or wall.

3. The combination with a faucet, cock or bib having a shank provided with external threads, the threads adjacent to the end of the shank being tapered and the threads on the intermediate portion of the shank being straight, a collar screw threaded on the straight thread and having a forwardly extending sleeve adapted to hide the straight threads in front of the engagement of the collar, said straight threads at the rear of the collar engagement being adapted to occupy an opening in a lavatory back or wall when the collar engages the front of such back or wall and the tapered thread occupies a standard female fitting abutting the rear of such back or wall.

4. The combination of a faucet, cock or bib having a shank provided with a tapered male thread adjacent to its end, a straight male thread on an intermediate portion of the shank, and a collar having a threaded engagement with the straight thread and adapted to occupy an intermediate position thereon, said collar being provided with a forwardly extending cylindrical sleeve adapted to overhang and cover the straight threads in front of the threaded engagement of the collar and overhang also an unthreaded portion of the shank, said straight threads at the rear of the collar being adapted to extend into a lavatory back or wall of substantial thickness, which is clamped between the collar, and a standard female member pipe fitting embracing the tapered threads and abutting the rear face of such back or wall.

5. The combination with a back, of a faucet, cock or bib having a threaded portion on its shank adapted to extend through the back and project on opposite sides thereof, the threaded portion extending in rear of the back comprising tapered threads to receive a pipe fitting and the portion extending in front of the back comprising straight threads, an internally threaded collar comprising a thin annular flange mounted on the straight threads and adjustable thereon to backs of varying thickness so that the flange will automatically be brought into intimate contact with the back when the cock is rotated to engage the pipe fitting, and means on the collar for concealing the straight threads in all positions of the collar.

6. The combination with a back, of a faucet, cock or bib having a threaded portion on its shank adapted to extend through the back and project on opposite sides thereof, the threaded portion extending in rear of the back comprising tapered threads to receive a pipe fitting and the portion extending in front of the back comprising straight threads, an internally threaded collar comprising a thin annular rearwardly dished flange mounted on the straight threads and adjustable thereon so that the flange will be automatically brought into intimate contact under pressure with the back when the cock is rotated to engage the pipe fitting, and a thin cylindrical sleeve integral with the collar of sufficient length to conceal the straight threads in all positions of the collar.

7. The combination, with a faucet, cock or bib having a shank on which are tapered threads extending from the rear end of the shank and parallel threads in front of the tapered threads, of a collar comprising an internally threaded ring mounted on the parallel threads, an unthreaded sleeve extending forwardly from the ring and of a diameter sufficiently larger than the threads of the ring to escape the threads on the shank while lying close to the shank in front of its threads and of sufficient length to shield and protect all of the threads in front of the ring, irrespective of the position of the ring on the parallel threads.

8. The combination, with a faucet, cock or bib having a shank on which are tapered threads extending from the rear end of the shank and parallel threads in front of the tapered threads, of a collar comprising an internally threaded ring mounted on the parallel threads, an unthreaded sleeve extending forwardly from the ring and of a diameter sufficiently larger than the threads of the ring to escape the threads on the shank while lying close to the shank in front of its threads and of sufficient length to shield and protect all of the threads in front of the ring, irrespective of the position of the ring on the parallel threads, and an annular flange adapted to be held by the threaded engagement of said ring against a lavatory back between the flange and a fitting on the tapered thread.

In testimony whereof, I hereunto affix my signature in the presence of two witnesses.

JOSEPH REGAR.

Witnesses:

ALBERT H. BATES,

ARCHER W. RICHARDS.